(12) United States Patent
Miyajima et al.

(10) Patent No.: US 12,729,319 B2
(45) Date of Patent: Sep. 8, 2026

(54) TREATMENT LIQUID COMPOSITION FOR INK JET TEXTILE PRINTING, INK SET, AND INK JET RECORDING METHOD

(71) Applicant: SEIKO EPSON CORPORATION, Tokyo (JP)

(72) Inventors: Yoshitaka Miyajima, Matsumoto (JP); Yuki Wakushima, Milan (IT)

(73) Assignee: SEIKO EPSON CORPORATION (JP)

( * ) Notice: Subject to any disclaimer, the term of this patent is extended or adjusted under 35 U.S.C. 154(b) by 14 days.

(21) Appl. No.: 18/599,648

(22) Filed: Mar. 8, 2024

(65) Prior Publication Data

US 2024/0301229 A1 Sep. 12, 2024

(30) Foreign Application Priority Data

Mar. 10, 2023 (JP) ................................ 2023-037754

(51) Int. Cl.
*C09D 11/54* (2014.01)
*B41M 3/00* (2006.01)
*B41M 5/00* (2006.01)

(52) U.S. Cl.
CPC ............ *C09D 11/54* (2013.01); *B41M 3/001* (2013.01); *B41M 3/008* (2013.01); *B41M 5/0017* (2013.01)

(58) Field of Classification Search
CPC ....... C09D 11/54; C09D 11/328; C09D 11/38; C09D 11/40; C09D 11/30; B41M 3/001; B41M 3/008; B41M 5/0017; B41M 5/0023
See application file for complete search history.

(56) References Cited

U.S. PATENT DOCUMENTS 6,641,652 B2 * 11/2003 Ouchi .................. C09D 11/322 106/31.86
2016/0023454 A1 1/2016 Sloan
2021/0179874 A1 * 6/2021 Takemoto ............ C09D 11/104
2022/0205174 A1 * 6/2022 Kozaka .................. D06P 5/002

FOREIGN PATENT DOCUMENTS

DE 142556 A5 * 7/1980
JP 64-4384 A * 1/1989
JP H11302985 A * 11/1999
JP 2004225189 A * 8/2004
JP 2006214030 A * 8/2006
JP 2010144073 A * 7/2010
JP 2011084680 A * 4/2011
JP 2017-530269 A 10/2017

(Continued)

OTHER PUBLICATIONS

Machine English translation of Desiderius Rudolf, DD-142556-A5, Ju. 2, 1980. (Year: 1980).*

(Continued)

*Primary Examiner* — Coris Fung
*Assistant Examiner* — Caroline D. Liott
(74) *Attorney, Agent, or Firm* — Harness, Dickey & Pierce, P.L.C.

(57) ABSTRACT

A treatment liquid composition for ink jet textile printing includes urea, sodium chlorate, polyethylene glycol having a molecular weight of over 1000 and less than 10000, and water.

9 Claims, 1 Drawing Sheet

(56) References Cited

FOREIGN PATENT DOCUMENTS

| | | | | |
|---|---|---|---|---|
| WO | WO-2009154101 A1 * | 12/2009 | ................ | D06P 5/30 |
| WO | WO-2011078068 A1 * | 6/2011 | ................ | D06P 5/30 |

OTHER PUBLICATIONS

Machine English translation of Kuwabara et al, JP 01-004384A, Jan. 9, 1989. (Year: 1989).*
Machine English translation of Taniguchi Makoto, JP-2004225189-A, Aug. 12, 2004. (Year: 2004).*
Machine English translation of Taniguchi Makoto, JP-2006214030-A, Aug. 17, 2006. (Year: 2006).*
Machine English translation of Watanabe Shinya, WO-2011078068-A1, Jun. 30, 2011. (Year: 2011).*
Machine English translation of Sunami Masaki, JP-H11302985-A, Nov. 2, 1999. (Year: 1999).*
Machine English translation of Morimoto Hitoshi, JP-2010144073-A, Jul. 1, 2010. (Year: 2010).*
Machine English translation of Ushiku Masayuki, JP-2011084680-A, Apr. 28, 2011. (Year: 2011).*
Machine English translation of Kudo Kei, WO-2009154101-A1, Dec. 23, 2009. (Year: 2009).*

* cited by examiner

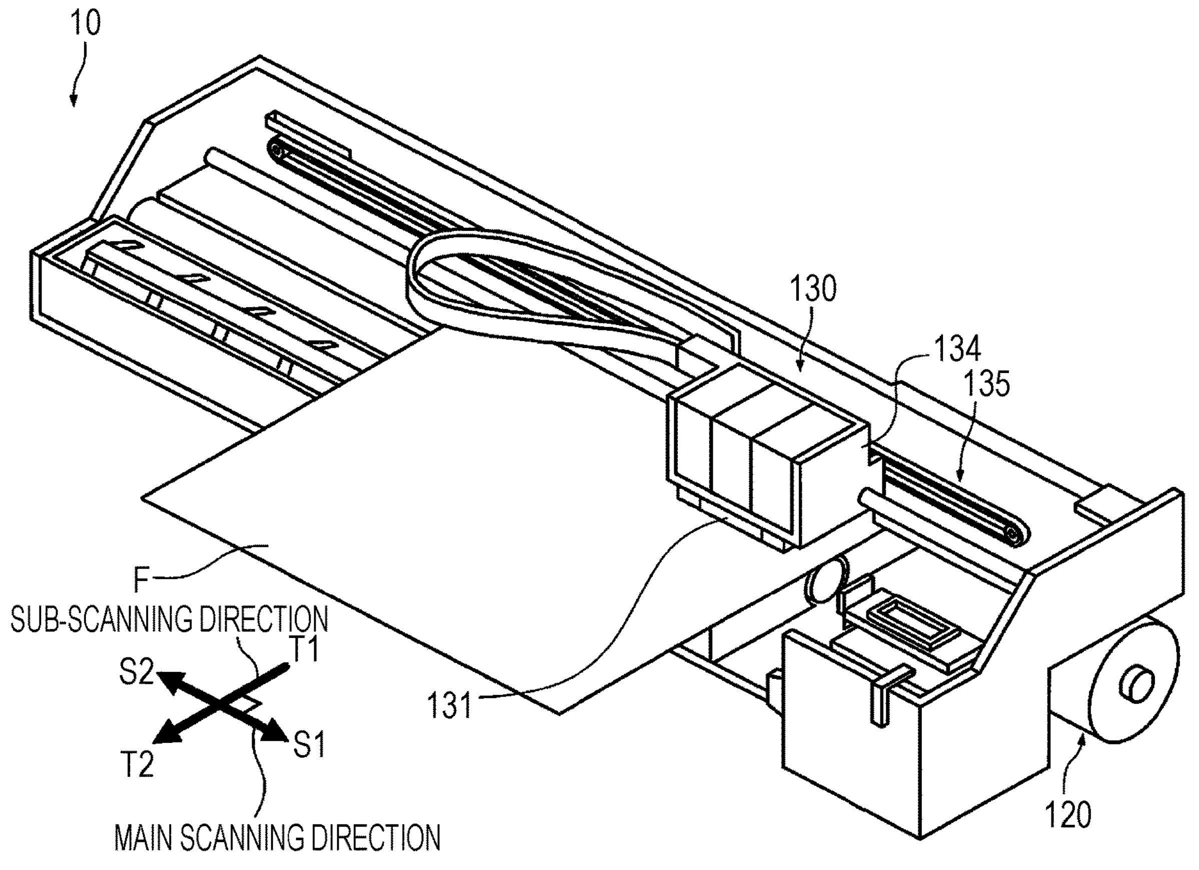
10
130
134
135
F
SUB-SCANNING DIRECTION
T1
S2
S1
T2
131
MAIN SCANNING DIRECTION
120

TREATMENT LIQUID COMPOSITION FOR INK JET TEXTILE PRINTING, INK SET, AND INK JET RECORDING METHOD

The present application is based on, and claims priority from JP Application Serial Number 2023-037754, filed Mar. 10, 2023, the disclosure of which is hereby incorporated by reference herein in its entirety.

BACKGROUND

1. Technical Field

The present disclosure relates to a treatment liquid composition for ink jet textile printing, an ink set, and an ink jet recording method.

2. Related Art

An ink jet recording method can record high-definition images by a relatively simple apparatus and makes rapid development in various fields. In particular, a recording method using a pigment textile printing ink for a fabric or the like has been variously investigated for improving the characteristics, such as color development, rubbing fastness, and the like, by treating a fabric or the like with a pretreatment liquid and then adhering the pigment textile printing ink. For example, JP-T-2017-530269 discloses a textile printing method in which in order to suppress bleeding and obtain a recorded matter having high color development, undercoating having an acrylic latex material is provided using an exclusive apparatus on a fabric before printing, and then the fabric is set in a printer and printed.

However, a recording method using an exclusive apparatus for pretreatment requires drying at each time when a treatment liquid composition and an ink are adhered and thus repeatedly requires heat energy necessary for drying. In addition, when in recording on a fabric, the use of a pigment as a coloring material has difficulty in obtaining texture and bright color development, and thus recording with a dye is preferred. However, there occur the problems peculiar to the use of a dye ink, such as those with color development, suppression of bleeding phenomenon (bleeding), and the like.

SUMMARY

According to an aspect of the present disclosure, a treatment liquid composition for ink jet textile printing contains urea, sodium chlorate, polyethylene glycol having a molecular weight of over 1000 and less than 10000, and water.

According to an aspect of the present disclosure, an ink set contains the treatment liquid composition for ink jet textile printing described above and an ink jet textile printing ink containing a reactive dye.

According to an aspect of the present disclosure, an ink jet recording method includes a treatment liquid adhesion step of adhering the treatment liquid composition for ink jet textile printing to a recording medium by an ink jet method, and an ink adhesion step of adhering an ink jet textile printing ink containing a reactive dye to the recording medium by an ink jet method.

BRIEF DESCRIPTION OF THE DRAWING

FIGURE is a drawing showing an example of a recording apparatus used in a recording method according to an embodiment of the present disclosure.

DESCRIPTION OF EMBODIMENTS

An embodiment of the present disclosure (referred to as a "present embodiment" hereinafter) is described in detail below, if required, with reference to the drawing, but the present disclosure is not limited to this, and various modifications can be made within a range not deviating from the gist of the present disclosure. In FIGURE, the same component is denoted by the same reference numeral, and thus the duplicated description is omitted. In addition, the vertical and horizontal positional relationships are based on the positional relationships shown in the drawing unless otherwise specified. Further, the dimensional ratios in the drawing are not limited to the ratios shown in the drawing.

1. Treatment Liquid Composition for Ink Jet Textile Printing

A treatment liquid composition for ink jet textile printing (also simply referred to as a "treatment liquid composition" hereinafter) according to a present embodiment contains urea, sodium chlorate, polyethylene glycol having a molecular weight of over 1000 and less than 10000, and water.

A recording method using a dye ink includes coating a pretreatment liquid on a fabric before printing in order to attempt to improve bleeding suppression and color development of the ink.

A pretreatment liquid for a pigment textile printing ink contains an aggregating agent such as cation or the like and thus can be configured to have a relatively low viscosity. Therefore, an inline printer for pigment textile printing is commercially available, in which a pretreatment liquid for a pigment ink can be coated by a spray system before ink jet ejection of the pigment ink.

However, on the other hand, a pretreatment liquid for a dye textile printing ink is required to contain an agent, such as a paste agent or the like, added for increasing viscosity. Therefore, it is difficult to provide an ink composition for ink jet. Recording with a dye textile printing ink requires steaming for fixing a dye to a recording medium to which the dye textile printing ink is adhered. When the dye textile printing ink has a low viscosity without containing a paste agent, the dye is moved by steaming, thereby causing the problem of worsening bleeding.

Thus, the pretreatment liquid for a pigment textile printing ink and the pretreatment liquid for a dye textile printing ink are fundamentally different from each other in the components contained, function, and physical properties such as viscosity, and thus due to this difference, a pretreatment liquid for a dye textile printing ink, which can be applied to an ink jet method, has been not provided.

In regard to this point, the inventors intensively studied a treatment liquid composition for ink jet textile printing not containing an agent, such as a paste agent, for increasing viscosity as an essential component. Specifically, attention was given to urea as a component which influences the color development and bleeding, and examination was made about the adding amount of urea which can suppress bleeding while securing actually usable color development As a result, it was found that a composition which can suppress bleeding while securing color development can be provided by using polyethylene glycol having a specific molecular weight in combination with urea. Despite the fact that the viscosity is not so much improved as with a usual paste agent, bleeding of the dye can be suppressed as with the paste agent, and more improvement in color development can be achieved. In addition, when an agent such a paste agent or the like for increasing the viscosity is not contained, instead there occurs a further problem that continuous printing stability cannot be secured because the viscosity is too low to be applied to an ink jet method. However, an attempt can be made to more improve the continuous printing stability by using polyethylene glycol having a specific molecular weight.

Also, as a result of further investigation, the inventors found that the solubility of urea in the pretreatment liquid is improved by using sodium chlorate in combination with urea, and thus precipitation of urea is also suppressed. This can more improve the adding amount of urea while obtaining the bleeding suppressing effect of polyethylene glycol having a specific molecular weight. Therefore, it is possible to achieve further improvement in color development, improvement in printing stability by suppressing precipitation of urea, and suppression of bleeding by combination with polyethylene glycol having a specific molecular weight.

The treatment liquid composition for ink jet textile printing, an ink set, and an ink jet recording method according to the present embodiment are described in detail below.

1. 1. Urea

The treatment liquid composition contains urea. The color development of the resultant recorded matter is improved by containing urea. Also, in the embodiment, a bleeding phenomenon is suppressed by using polyethylene glycol having a specific molecular weight in combination with urea. In the embodiment, the treatment liquid composition may contain a urea derivative in addition to urea.

The content of urea relative to the total amount of the treatment liquid composition is preferably 10% by mass or more and 20% by mass or less, 12% by mass or more and 18% by mass or less, or 14% by mass or more and 16% by mass or less. When the content of urea is 10% by mass or more relative to the total amount of the treatment liquid composition, the color development tends to be more excellent. In addition, when the content of urea is 20% by mass or less relative to the total amount of the treatment liquid composition, there is a tendency that the solubility of urea is improved, continuous printing stability is more improved, and bleeding is more suppressed.

1. 2. Sodium Chlorate

The treatment liquid composition contains sodium chlorate. The solubility of urea is improved by containing sodium chlorate, the clogging recoverability of the treatment liquid composition and color development of the resultant recorded matter are excellent. In the present embodiment, the treatment liquid composition may contain a derivative of sodium chlorate in addition to the sodium chlorate.

The content of sodium chlorate relative to the total amount of the treatment liquid composition is preferably 1.0% by mass or more and 15.0% by mass or less, 2.5% by mass or more and 12.5% by mass or less, or 5.0% by mass or more and 10.0% by mass or less. When the content of sodium chlorate is within the range described above, there is a tendency that the solubility of urea is more improved, and clogging recoverability and the color development of the resultant recorded matter are more improved.

The mass ratio of the content of sodium chlorate relative to urea in the treatment liquid composition is preferably 0.2 or more and 0.8 or less, 0.3 or more and 0.7 or less, or 0.4 or more and 0.6 or less. With the mass ratio described above, there is a tendency that the solubility of urea is more improved, and clogging recoverability and the color development of the resultant recorded matter are more improved.

1. 2. 1. Other Alkali Metal Salt

In the present embodiment, besides the sodium chlorate, an alkali metal salt may be further contained. Preferably, at least one of potassium hydrogen carbonate and sodium carbonate is further contained, or potassium hydrogen carbonate is further contained. When such an alkali metal salt is further contained, there is a tendency that the solubility of urea is more improved, and clogging recoverability and color development are excellent.

1. 3. Polyethylene Glycol

The treatment liquid composition contains polyethylene glycol (also referred to as "polyethylene glycol P" hereinafter) having a molecular weight of over 1,000 and less than 10,000. The containing of the polyethylene glycol P makes viscosity suitable during ejection of the treatment liquid, improves color development, and contributes to stable printing. In addition, one single type or combination or two or more types may be used as the polyethylene glycol P.

From the same viewpoint as described above, the treatment liquid composition more preferably contains polyethylene glycol having a molecular weight of 1,200 or more and 9,000 or less, and still more preferably contains polyethylene glycol having a molecular weight of 1,500 or more and 8,000 or less. In the embodiment, the molecular weight of polyethylene glycol represents the weight-average molecular weight.

The polyethylene glycol P preferably contains two or more polyethylene glycols having different molecular weights. This configuration tends to more improve the viscosity of the treatment liquid and improves permeability and the effect of suppressing a bleeding phenomenon. From the same viewpoint as described above, the polyethylene glycol P more preferably contains one each of polyethylene glycol having a molecular weight of over 1,000 and less than 4,000 (also referred to as "polyethylene glycol A" hereinafter) and polyethylene glycol having a molecular weight of 4,000 or more and less than 10000 (also referred to as "polyethylene glycol B" hereinafter).

The molecular weight of the polyethylene glycol A is over 1,000 and less than 4,000 and preferably from 1,100 to 3,500, from 1,200 to 3,000, or from 1,300 to 2,500. Also, the molecular weight of the polyethylene glycol B is 4,000 or more and less than 10,000 and preferably from 4,500 to 9,000, from 5,000 to 8,000, or from 5,500 to 7,000.

The total content of the polyethylene glycol P relative to the total amount of the treatment liquid composition is preferably 1.0% by mass or more and 20.0% by mass or less, 2.5% by mass or more and 15.0% by mass or less, 5.0% by mass or more and 12.5% by mass or less, or 7.5% by mass or more and 10.0% by mass or less. With the total content of the polyethylene glycol P within the range described above, there is a tendency that the viscosity during ejection of the treatment liquid is made more suitable, and permeability and the effect of suppressing a bleeding phenomenon are improved.

1. 4. Water-Soluble Organic Solvent

The treatment liquid composition preferably contains a water-soluble organic solvent. Examples of the water-soluble organic solvent include compounds having three hydroxyl groups, such as a glycol-based solvent, a glycol monoether-based solvent, glycerin, and the like; a nitrogen-containing solvent; an alcohol-based solvent, and the like. Among the water-soluble organic solvents, from the viewpoint of improving permeability and color development, the glycol-based solvent is preferably contained. The water-soluble organic solvents may be used alone or in combination of two or more.

Preferably used is a glycol-based solvent having a molecular weight of 100 or less and a standard boiling point of 230° C. or less. By containing such a glycol-based solvent, permeability and color development tend to be more improved.

Specific examples of the glycol-based solvent include 1,3-butylene glycol (1,3-butanediol), ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, and the like. From the viewpoint of more effectively and securely exhibiting the effect of the present disclosure, 1,3-butylene glycol (1,3-butanediol) is preferred.

The content of the glycol-based solvent relative to the total amount of the treatment liquid composition is preferably 0.1% by mass or more and 5.0% by mass or less, 0.5% by mass or more and 3.0% by mass or less, or 0.7% by mass or more and 2.0% by mass or less. With the content of the glycol-based solvent within the range described above, the effect of the present disclosure is more effectively and securely exhibited.

Examples of solvents other than the glycol-based solvent include glycol monoether-based solvents such as ethylene glycol monomethyl ether, ethylene glycol monoethyl ether, triethylene glycol monobutyl ether, and the like; nitrogen-containing solvents such as 2-pyrrolidone, N-methyl-2-pyrrolidone, N-ethyl-2-pyrrolidone, and the like; and alcohol-based solvents such as methanol, ethanol, n-propyl alcohol, iso-propyl alcohol, n-butanol, 2-butanol, tert-butanol, iso-butanol, n-pentanol, and the like.

The content of the water-soluble organic solvent relative to the total amount of the treatment liquid composition is preferably 0.1% by mass or more and 5.0% by mass or less, 0.5% by mass or more and 3.0% by mass or less, or 0.7% by mass or more and 2.0% by mass or less. With the content of the water-soluble organic solvent within the range described above, the effect of the present disclosure can be more effectively and securely exhibited.

1. 5. Surfactant

The treatment liquid composition may further contain a surfactant. Examples of the surfactant include an acetylene glycol-based surfactant, a silicone-based surfactant, a fluorine-based surfactant, and the like. The surfactants may be used alone or in combination of two or more.

From the viewpoint of more effectively and securely exhibiting the effect of the present disclosure, the treatment liquid composition preferably contains an acetylene glycol-based surfactant. Examples of the acetylene glycol-based surfactant include Olfine (registered trademark) B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (manufactured by Nissin Chemical Co., Ltd.), Surfynol (registered trademark) 104, 104E, 104H, 104A, 104BC, 104DPM, 104PA, 104PG-50, 104S, 420, 440, 465, and 485, and Acetynol (registered trademark) E00, E00P, E40, and E100 (manufactured by Kawaken Fine Chemicals Co., Ltd.). Among these, PD-002W is preferably used from the same viewpoint as described above.

Examples of the silicone-based surfactant include polysiloxane-based compounds such as polyether-modified organosiloxane and the like. Examples of commercial products of the polyether-modified organosiloxane include BYK-306, BYK-307, BYK-333, BYK-341, BYK-345, BYK-346, and BYK-348 (manufactured by BYK Chemie Japan K. K.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (manufactured by Shin-Etsu Chemical Co., Ltd.).

Examples of the fluorine-based surfactant include fluorine-modified polymers, for example, BYK-340 (manufactured by BYK Chemie Japan K. K.).

The content of the surfactant relative to the total amount of the treatment liquid composition is preferably 0.01% by mass or more and 10.0% by mass or less, 0.05% by mass or more and 5.0% by mass or less, or 0.07% by mass or more and 1.0% by mass or less. With the content of the surfactant within the range described above, the effect of the present disclosure can be more effectively and securely exhibited.

1. 6. Water

The treatment liquid composition contains water. Examples of water include pure water such as ion exchange water, ultrafiltered water, reverse osmosis water, and distilled water; and super-pure water.

The content of water relative to the total amount of the treatment liquid composition is preferably 30% by mass or more and 95% by mass or less, 40% by mass or more and 90% by mass or less, 50% by mass or more and 80% by mass or less, or 55% by mass or more and 75% by mass or less. With the content of water within the range described above, the effect of the present disclosure is more effectively and securely exhibited.

1. 7. Other Component

If required, the treatment liquid composition may further contain a component other than the those described above. Examples of the other component include, but are not particularly limited to, a solubilizer, a viscosity modifier, a pH adjuster, an antioxidant, a preservative, an anti-mold agent, a corrosion inhibitor, a chelating agent for capturing metal ions, which influence dispersion, other additives, and a solvent other than the solvent described above, and the like.

The treatment liquid composition for ink jet textile printing according to the embodiment can be prepared by a known method, and, for example, can be prepared by mixing the components in an arbitrary order and, if required, removing impurities and foreign materials by filtration or the like. A method used for mixing the components is, for example, a method of adding in order the components to a vessel provided with a stirring device such as a mechanical stirrer, a magnetic stirrer, or the like, and stirring and mixing the components. Examples of a filtration method include centrifugal filtration, filter filtration, and the like.

1. 8. Physical Properties

The pH of the treatment liquid composition is preferably 7 or more and 11 or less or 8 or more and 10 or less. The treatment liquid composition having a pH within the range described above tends to exhibit excellent continuous printing stability and clogging recoverability, suppress bleeding, and more improve color development and permeability.

The viscosity at 25° C. of the treatment liquid composition is preferably 2.50 $mm^2/s$ or more and 7.50 $mm^2/s$ or less, 3.00 $mm^2/s$ or more and 6.50 $mm^2/s$ or less, or 3.20 $mm^2/s$ or more and 5.00 $mm^2/s$ or less. The treatment liquid composition having viscosity at 25° C. within the range described above tends to exhibit excellent continuous printing stability, suppress bleeding, and more improve color development and permeability.

The surface tension of the treatment liquid composition is preferably 25 mN/m or more and 40 mN/m or less or 30 mN/m or more and 35 mN/m or less. The treatment liquid composition having surface tension within the range described above tends to exhibit excellent continuous printing stability and clogging recoverability, suppress bleeding, and more improve color development and permeability.

2. Ink Set

An ink set according to the embodiment contains the treatment liquid composition for ink jet textile printing described above, and an ink jet textile printing ink containing a reactive dye. The use of the ink set improves the continuous printing stability and clogging recoverability of the treatment liquid composition, and the resultant recorded matter has excellent color development, suppression of a bleeding phenomenon, and permeability.

Examples of the reactive dye contained in the ink jet textile printing ink include C. I. Reactive Yellow 3, 6, 12, 18, and 86; C. I. Reactive Orange 2, 5, 12, 13, and 20; C. I. Reactive Red 3, 4, 7, 12, 13, 15, 16, 24, 29, 31, 32, 33, 43, 45, 46, 58, and 59; C. I. Reactive Violet 1 and 2; C. I. Reactive Blue 2, 3, 5, 7, 13, 14, 15, 25, 26, 39, 40, 41, 46, 49, and 176; C. I. Reactive Green 5 and 8; C. I. Reactive Brown 1, 2, 7, 8, 9, 11, and 14; C. I. Reactive Black 1, 2, 3, 8, 10, 12, and 13; and the like. In the present specification, the "reactive dye" represents a compound classified as a reactive dye in the color indexes.

3. Ink Jet Recording Method

An ink jet recording method of the embodiment includes a treatment liquid adhesion step of adhering the treatment liquid composition for ink jet textile printing described above to a recording medium by an ink jet method, and an ink adhesion step of adhering an ink jet textile printing ink containing a reactive dye to the recording medium by an ink jet method. The use of the recording method improves continuous printing stability and clogging recoverability in the treatment liquid adhesion step, and the resultant recorded matter has excellent color development and suppression of a bleeding phenomenon.

In the embodiment, the "ink jet method" represents a system in which an ink composition and a treatment liquid are ejected from nozzles in an ink jet head. Examples of this system include a method in which a composition filled in a pressure generating chamber of an ink jet head is ejected from nozzles by driving a pressure generating unit, and a method in which a composition is ejected by applying thermal energy. Examples of a method for applying pressure to the ink composition in nozzles include, but are not particularly limited to, a piezo system in which the ink composition is ejected as droplets by using a piezoelectric element, and a thermal system in which droplets are ejected by heating.

3. 1. Treatment Liquid Adhesion Step

The treatment liquid adhesion step includes adhering the treatment liquid composition to the recording medium by the ink jet method. In the treatment liquid adhesion step, the amount of urea adhered to the recording medium is preferably 4 $g/m^2$ or more and 9 $g/m^2$ or less. When the amount of urea adhered is within the range described above, there is the tendency to improve the color development of the resultant recorded matter and suppress a bleeding phenomenon.

3. 2. Ink Adhesion Step

The ink adhesion step includes further adhering a textile printing ink by the ink jet method on a portion to which the treatment liquid composition is adhered.

In the ink jet recording method of the embodiment, the treatment liquid adhesion step and the ink adhesion step may be performed in the same pass or different passes. In particular, the treatment liquid adhesion step and the ink adhesion step are preferably performed in the same pass. The use of the treatment liquid composition for textile printing described above enables the ink adhesion step to be performed immediately after the treatment liquid adhesion step. Also, in this way, when the treatment liquid adhesion step and the ink adhesion step are performed in the same pass, heating energy necessary for drying can be decreased, and thus productivity of the recorded matter is excellent.

3. 3. Drying Step

The drying step includes drying a fabric by heating after the treatment liquid adhesion step and the ink adhesion step. A known drying unit can be used as the drying unit. In the embodiment, the drying step may be performed only after the ink adhesion step. The use of the treatment liquid composition enables the ink adhesion step to be performed after the treatment liquid adhesion step without the drying step, and thus heating energy necessary for drying can be decreased, thereby exhibiting excellent productivity of the recorded matter.

3. 4. Other Step

If required, the recording method of the embodiment may include other steps in addition to the steps described above. For example, the fabric may be naturally dried as another step after the treatment liquid adhesion step and before the ink adhesion step.

4. Recording Medium

The recording medium used in the embodiment is not particularly limited and may be a fabric, and examples of fibers constituting a fabric include natural fibers such as cotton, silk, and wool; regenerated fibers such as rayon, cupra, and the like; a mixture of natural fibers and regenerated fibers; a mixture with synthetic fibers such as polyester fibers, nylon fibers, triacetate fibers, diacetate fibers, polyamide fibers, or the like; and the like.

5. Ink Jet Recording Apparatus

An ink jet recording apparatus used for adhering the treatment liquid composition and the textile printing ink to the recording medium by the ink jet recording apparatus is not particularly limited, and any one of a serial type and a line type can be used. FIGURE is a perspective view showing a serial type recording apparatus as an example of the ink jet recording apparatus. As shown in FIGURE, a serial type recording apparatus 10 includes a transport portion 120 and a recording portion 130. The transport portion 120 transports a recording medium F fed to the serial type recording apparatus to the recording portion 130, and discharges the recording medium F after recording to the outside of the serial type recording apparatus. Specifically, the transport portion 120 has feed rollers and transports the fed recording medium F in the sub-scanning direction T1.

In addition, the recording portion 130 in the recording apparatus includes a carriage 134 loaded with an ink jet head 131 having nozzles which eject the treatment liquid composition and the textile printing ink to the recording medium F sent from the transport portion 120, and a carriage moving mechanism 135 which moves the carriage 134 in the main scanning direction S1/S2 of the recording medium F.

Also, the recording portion 130 of the recording apparatus has nozzles which eject the treatment liquid composition and the textile printing ink.

In the serial type recording apparatus, a head having a length smaller than the width of the recording medium is provided as the ink jet head 131, and recording is performed by movement of the head in a plurality of passes (multipass). Also, the serial type recording apparatus includes the head 131 loaded on the carriage 134 which is moved in a predetermined direction, and the ink composition is ejected on the recording medium by movement of the head in association with the movement of the carriage. This permits adhesion in two or more passes (multipass). In addition, the "pass" is also referred to as "main scanning". Further, sub-scanning is performed to transport the recording medium between passes. That is, main scanning and sub-scanning are alternately performed.

Examples

The present disclosure is more specifically described below by using example and comparative examples. The present disclosure is not limited to the examples below.

1. Preparation of Treatment Liquid Composition for Textile Printing

Components were added to a tank for a mixture so as to obtain the compositions described in Tables 1 to 3, mixed and stirred, and then filtered with a membrane filter, preparing a treatment liquid composition for textile printing of each of the examples. In the tables, the numerical value of each of the components shown in each of the examples represents "% by mass" unless otherwise specified.

The product components used in Tables 1 to 3 are as follows.

Water-Soluble Organic Solvent

- 1,3-Butylene glycol

Polyethylene Glycol

- PEG 400 (manufactured by Fujifilm Wako Pure Chemical Corporation)
- PEG 1000 (manufactured by Fujifilm Wako Pure Chemical Corporation)
- PEG 1500 (manufactured by Nacalai Tesque, Inc.)
- PEG 6000 (manufactured by Fujifilm Wako Pure Chemical Corporation)
- PEG 10000 (manufactured by Fujifilm Wako Pure Chemical Corporation)
- PEG 12000 (manufactured by Fujifilm Wako Pure Chemical Corporation)

Surfactant

- Olfine PD-002W (trade name, acetylene glycol-based surfactant, manufactured by Nissin Chemical Co., Ltd.)

2. Preparation of Ink Set

Various evaluations were carried out by using ink sets having four configuration types. A commercial product GENESTA (manufactured by Seiko Epson Corporation) was used as a reactive dye ink other than the treatment liquid composition. Tables 1 to 3 show the symbol of the ink set used in each of the examples.

Type 1

The ink set included 1 slot of the treatment liquid composition and 7 slots (7 colors) of reactive dye inks. The 7 colors of reactive dye inks used included yellow, crimson, cyan, black, blue, orange, and gray.

Type 2

The ink set included 2 slots of the treatment liquid composition and 6 slots (6 colors) of reactive dye inks. The 6 colors of reactive dye inks used included yellow, crimson, cyan, black, blue, and orange.

Type 3

The ink set included 3 slots of the treatment liquid composition and 5 slots (5 colors) of reactive dye inks. The 5 colors of reactive dye inks used included yellow, crimson, cyan, black, and blue.

Type 4

The ink set included 4 slots of the treatment liquid composition and 4 slots (4 colors) of reactive dye inks. The 4 colors of reactive dye inks used included yellow, crimson, cyan, and black.

3. Recording Method

The treatment liquid composition and the reactive dye inks were set in Monna Lisa ink jet textile printing machine (Monna Lisa Evo Tre 16-180, manufactured by Seiko Epson Corporation), and an image design and a solid pattern were printed with 900×600 dpi in 4 passes.

In the examples, recording was performed by two types of recording methods. A distinction was made between a method (type A) of simultaneously printing the treatment liquid composition and the reactive dye inks in the same pass, and a method (type B) of ejecting the treatment liquid composition and the reactive dye inks in different passes. In printing of the type B, the treatment liquid composition was ejected in the first pass and the second pass, and the reactive dye inks were ejecting in the third pass and the fourth pass. The adhesion amount of urea of the treatment liquid composition was 8.7 g/m$^2$.

One of the three types below was used as a fabric (recording medium) used in printing.

- Fabric A: cotton (thickness: 0.30 mm) ("100% cotton", manufactured by Epson Como Printing Technologies Srl)
- Fabric B: thick cotton (thickness: 0.61 mm) ("100% cotton", manufactured by Epson Como Printing Technologies Srl)
- Fabric C: T-shirt fabric ("92% cotton, 8% elastomer", manufactured by Epson Como Printing Technologies Srl)

After printing, all printed matters were treated by using a high-temperature steamer (manufactured by Tsujii Senki Kogyo Co., Ltd., "HT-3-550 model") under the conditions of 102° C. and 10 minutes, and then dried, producing recorded matters.

In the recording method described above, the treatment liquid composition (described in detail below) was used, and eight colors of GENESTA described above (yellow, crimson, cyan, black, blue, orange, gray, and red) were used as the reactive dye inks, and the same design as described above was printed to obtain a sample used as a reference (referred to as the "reference sample" hereinafter).

Composition of Treatment Liquid Composition

- Hydroxyethyl cellulose (manufactured by Fujifilm Wako Pure Chemical Corporation): 3% by mass
- Urea (manufactured by Fujifilm Wako Pure Chemical Corporation): 10% by mass
- Sodium meta-nitrobenzene sulfonate (manufactured by Fujifilm Wako Pure Chemical Corporation): 3% by mass
- Sodium hydrogen carbonate (manufactured by Fujifilm Wako Pure Chemical Corporation): 4% by mass
- Water Balance 4. Evaluation Method 4. 1. Color Development Evaluation was made by comparing the printed matter obtained as described above with the reference sample. The evaluation criteria are as follows, and the results are shown in Tables 1 to 3.

Evaluation Criteria

A: The color development was equivalent to or better than the reference sample.

B: The color development was slightly inferior to the reference sample within a range having no practical problem.

C: The color development was clearly inferior to the reference sample.

D: The color development was significantly inferior to the reference sample.

4. 2. Permeability

The image states of the printed matter and the reference sample obtained by the method described above were visually compared and evaluated according to evaluation criteria below. The evaluation results are shown in Table 1 to 3.

Evaluation Criteria

A: The image quality was equivalent to or better than the reference sample.

B: The ink filling state of the printing portion was slightly inferior at a level with no practical problem as compared with the reference sample.

C: There was a discolored point in the printing portion as compared with the reference sample.

D: There was a discolored point in the printing portion and unevenness occurred in the solid pattern portion as compared with the reference sample.

4. 3. Bleeding

The bleeding states of the printed matter and the reference sample obtained by the method described above were visually compared and evaluated according to evaluation criteria below. The evaluation results are shown in Table 1 to 3.

Evaluation Criteria

A: An image without bleeding was obtained similarly to the reference sample.

B: Bleeding was slightly observed at a level with no practical problem in a fine line portion as compared with the reference sample.

C: Bleeding was clearly observed in a fine line portion as compared with the reference sample.

D: Bleeding was significantly observed in a fine line portion as compared with the reference sample.

4. 4. Continuous Printing Stability

The state of the printed matter obtained by the method described above was confirmed. The evaluation criteria are as follows, and the results are shown in Tables 1 to 3.

Evaluation Criteria

A: No change in printing quality was observed in the reference sample obtained by 1000 m continuous printing.

B: In 1000 m continuous printing, the reference sample showed a slight decrease in color development in the last 50 m with no problem in practical use.

C: In 1000 m continuous printing, the reference sample had no problem with printing quality in the first half 500 m, but color development of the reference sample was gradually decreased after passing 500 m.

D: In 1000 m continuous printing, the reference sample had no problem with printing quality in the first 100 m, but color development of the reference sample was gradually decreased after passing 100 m and the print design was finally almost disappeared.

4. 5. Clogging Recoverability

A nozzle check pattern was printed by using an ink jet textile printing machine (Monna Lisa Evo Tre 16-180, manufactured by Seiko Epson Corporation) loaded with each of the ink sets, and it was confirmed that there was no filling defect/nozzle clogging. Then, the machine was allowed to stand for 2 weeks in a room temperature atmosphere in the state the head was returned to the home position. After allowed to stand, the nozzle check pattern was printed, and the clogging recoverability of the ink composition for the ink jet head was evaluated by observing the nozzle ejection condition. The evaluation criteria are as follows, and the results are shown in Table 1 t 3.

Evaluation Criteria

A: The ink composition was normally ejected from all nozzles within 2 times of cleaning operations.

B: The ink composition was normally ejected from all nozzles after 3 times of cleaning operations.

C: The ink composition was normally ejected from all nozzles after 4 or more times of cleaning operations.

D: The ink composition was not normally ejected from some of the nozzles even after 4 or more times of cleaning operations.

TABLE 1

| Treatment liquid composition (% by mass) | | Example 1 | Example 2 | Example 3 | Example 4 | Example 5 |
|---|---|---|---|---|---|---|
| Urea | | 15.00 | 15.00 | 15.00 | 15.00 | 15.00 |
| Sodium chlorate | | 7.50 | 7.50 | 7.50 | 7.50 | 7.50 |
| Sodium hydrogen carbonate | | — | — | — | — | — |
| Potassium hydrogen carbonate | | 6.00 | 6.00 | 6.00 | 6.00 | 6.00 |
| Water-soluble organic solvent | 1,3-Butylene glycol | 1.00 | 1.00 | 1.00 | 1.00 | 1.00 |
| Polyethylene glycol | PEG 400 | — | — | — | — | — |
| | PEG 1000 | — | — | — | — | — |
| | PEG 1500 | 4.00 | 4.00 | 4.00 | 4.00 | 4.00 |
| | PEG 6000 | 4.00 | 4.00 | 4.00 | 4.00 | 4.00 |
| | PEG 10000 | — | — | — | — | — |
| | PEG 12000 | — | — | — | — | — |
| Surfactant | Olfine PD-002W | 0.10 | 0.10 | 0.10 | 0.10 | 0.10 |
| Water | | Balance | Balance | Balance | Balance | Balance |
| Total | | 100.00 | 100.00 | 100.00 | 100.00 | 100.00 |

TABLE 1-continued

| Treatment liquid composition (% by mass) | | Example 1 | Example 2 | Example 3 | Example 4 | Example 5 |
|---|---|---|---|---|---|---|
| Treatment liquid composition | Viscosity ($mm^2/s$) | 3.62 | 3.62 | 3.62 | 3.62 | 3.62 |
| Ink set | | Type 1 | Type 2 | Type 2 | Type 3 | Type 4 |
| Recording method | | Type A | Type A | Type A | Type A | Type A |
| Fabric in evaluation | | Fabric A | Fabric A | Fabric B | Fabric B | Fabric C |
| Evaluation of ink set | Color development | B | A | B | A | A |
| | Bleeding | A | A | A | A | A |
| | Continuous printing stability | A | A | A | A | A |
| | Clogging recoverability | A | A | A | A | A |
| | Permeability | B | A | B | B | A |

TABLE 2

| Treatment liquid composition (% by mass) | | Example 6 | Example 7 | Example 8 | Example 9 | Example 10 |
|---|---|---|---|---|---|---|
| Urea | | 15.00 | 15.00 | 15.00 | 15.00 | 15.00 |
| Sodium chlorate | | 7.50 | 7.50 | 7.50 | 7.50 | 7.50 |
| Sodium hydrogen carbonate | | — | — | — | — | — |
| Potassium hydrogen carbonate | | 6.00 | 6.00 | 6.00 | 6.00 | — |
| Water-soluble organic solvent | 1,3-Butylene glycol | 1.00 | 1.00 | 1.00 | — | 1.00 |
| Polyethylene glycol | PEG 400 | — | — | — | — | — |
| | PEG 1000 | — | — | — | — | — |
| | PEG 1500 | 4.00 | — | 9.50 | 4.00 | 4.00 |
| | PEG 6000 | 4.00 | 5.70 | — | 4.00 | 4.00 |
| | PEG 10000 | — | — | — | — | — |
| | PEG 12000 | — | — | — | — | — |
| Surfactant | Olfine PD-002W | 0.10 | 0.10 | 0.10 | 0.10 | 0.10 |
| Water | | Balance | Balance | Balance | Balance | Balance |
| Total | | 100.00 | 100.00 | 100.00 | 100.00 | 100.00 |
| Treatment liquid composition | Viscosity ($mm^2/s$) | 3.62 | 3.39 | 3.35 | 3.50 | 3.60 |
| Ink set | | Type 2 | Type 2 | Type 2 | Type 2 | Type 2 |
| Recording method | | Type B | Type A | Type A | Type A | Type A |
| Fabric in evaluation | | Fabric B | Fabric A | Fabric A | Fabric A | Fabric A |
| Evaluation of ink set | Color development | A | A | A | A | A |
| | Bleeding | B | B | B | A | A |
| | Continuous printing stability | A | A | A | A | A |
| | Clogging recoverability | A | A | A | A | B |
| | Permeability | B | B | B | B | A |

TABLE 3

| Treatment liquid composition (% by mass) | Comparative Example 1 | Comparative Example 2 | Comparative Example 3 | Comparative Example 4 | Comparative Example 5 | Comparative Example 6 |
|---|---|---|---|---|---|---|
| Urea | 15.00 | 15.00 | 15.00 | 15.00 | 15.00 | 15.00 |
| Sodium chlorate | — | 7.50 | 7.50 | 7.50 | 7.50 | 7.50 |
| Sodium hydrogen carbonate | 7.50 | — | — | — | — | — |

TABLE 3-continued

| Treatment liquid composition (% by mass) | | Comparative Example 1 | Comparative Example 2 | Comparative Example 3 | Comparative Example 4 | Comparative Example 5 | Comparative Example 6 |
|---|---|---|---|---|---|---|---|
| Potassium hydrogen carbonate | | 6.00 | 6.00 | 6.00 | 6.00 | 6.00 | 6.00 |
| Water-soluble organic solvent | 1,3-Butylene glycol | 1.00 | 1.00 | 1.00 | 1.00 | 1.00 | 1.00 |
| Polyethylene glycol | PEG 400 | — | — | — | 14.60 | — | — |
| | PEG 1000 | — | — | 11.20 | — | — | — |
| | PEG 1500 | — | — | — | — | — | — |
| | PEG 6000 | 5.70 | — | — | — | — | — |
| | PEG 10000 | — | — | — | — | 3.00 | — |
| | PEG 12000 | — | — | — | — | — | 2.00 |
| Surfactant | Olfine PD-002W | 0.10 | 0.10 | 0.10 | 0.10 | 0.10 | 0.10 |
| Water | | Balance | Balance | Balance | Balance | Balance | Balance |
| Total | | 100.00 | 100.00 | 100.00 | 100.00 | 100.00 | 100.00 |
| Treatment liquid composition | Viscosity ($mm^2/s$) | 3.35 | 1.29 | 3.42 | 3.55 | 3.60 | 3.70 |
| Ink set | | Type 2 | Type 2 | Type 2 | Type 2 | Type 2 | Type 2 |
| Recording method | | Type A | Type A | Type A | Type A | Type A | Type A |
| Fabric in evaluation | | Fabric A | Fabric A | Fabric A | Fabric A | Fabric A | Fabric A |
| Evaluation of ink set | Color development | C | D | D | D | D | D |
| | Bleeding | C | D | C | D | D | D |
| | Continuous printing stability | D | D | D | D | D | D |
| | Clogging recoverability | D | D | D | D | D | D |
| | Permeability | C | D | C | D | D | D |

6. Evaluation Results

Table 1 to 3 show the composition of the treatment liquid used in each of the examples and the evaluation results. Table 1 to 3 indicate that in recording with the treatment liquid composition for ink jet textile printing, containing urea, sodium chlorate, polyethylene glycol having a molecular weight of over 1000 and less than 10000, and water, the resultant recorded matter is excellent in color development, permeability, continuous printing stability, and clogging recoverability, and a bleeding phenomenon can be suppressed.

What is claimed is:

1. A treatment liquid composition for ink jet textile printing, comprising:

urea;

sodium chlorate;

a first polyethylene glycol having a molecular weight of over 1000 and less than 4000; a second polyethylene glycol having a molecular weight of 4000 or more to less than 10000;

a glycol-based solvent selected from 1,3-butylene glycol, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, or 1,6-hexanediol, an amount of the glycol-based solvent being in the range of 0.5 to 3% by mass;

potassium hydrogen carbonate; and water.

2. The treatment liquid composition for ink jet textile printing according to claim 1, wherein the content of urea is 10% by mass or more and 20% by mass or less relative to the total amount of the treatment liquid composition.

3. The treatment liquid composition for ink jet textile printing according to claim 1, wherein the molecular weight of the glycol-based solvent is 100 or less; and the standard boiling point of the glycol-based solvent is 230° C. or less.

4. The treatment liquid composition for ink jet textile printing according to claim 1, wherein the content of the sodium chlorate is 1.0% by mass or more and 15.0% by mass or less relative to the total amount of the treatment liquid composition.

5. The treatment liquid composition for ink jet textile printing according to claim 1, wherein the total content of the first polyethylene glycol and the second polyethylene glycol is 1.0% by mass or more and 20.0% by mass or less relative to the total amount of the treatment liquid composition.

6. The treatment liquid composition for ink jet textile printing according to claim 1, wherein the pH is 8 or more and 10 or less.

7. The treatment liquid composition for ink jet textile printing according to claim 1, wherein the viscosity at 25° C. is 3.00 $mm^2/s$ or more and 6.50 $mm^2/s$ or less.

8. The treatment liquid composition for ink jet textile printing according to claim 1, wherein the surface tension is 30 mN/m or more and 35 mN/m or less.

9. An ink set comprising:

the treatment liquid composition for ink jet textile printing according to claim 1; and an ink jet textile printing ink containing a reactive dye.

* * * * *